United States Patent
Watts et al.

[15] 3,699,177
[45] Oct. 17, 1972

[54] PREPARATION OF HALOGENATED AROMATIC COMPOUNDS

[72] Inventors: Lewis William Watts; Philip H. Moss, both of Austin, Tex.

[73] Assignee: Jefferson Chemical Company, Inc., Houston, Tex.

[22] Filed: Nov. 3, 1969

[21] Appl. No.: 873,643

[52] U.S. Cl..........260/649 D, 260/649 R, 260/649 F
[51] Int. Cl.........................C07c 25/00, C07c 25/18
[58] Field of Search.................260/649, 649 DP, 650

[56] References Cited

UNITED STATES PATENTS

| | | | |
|---|---|---|---|
| 2,019,015 | 10/1935 | McCullough | 260/649 DP |
| 2,989,571 | 6/1961 | Eisenlohr | 260/649 R X |
| 3,234,295 | 2/1966 | Sprauer | 260/654 H |

FOREIGN PATENTS OR APPLICATIONS

| | | | |
|---|---|---|---|
| 897,149 | 5/1962 | Great Britain | 260/649 DP |
| 436,653 | 10/1935 | Great Britain | 260/649 DP |
| 38/1622 | 3/1963 | Japan | 260/650 R |

*Primary Examiner*—Howard T. Mars
*Attorney*—John R. Kirk, Jr. and H. G. Jackson

[57] ABSTRACT

A process for preparing halogenated aromatic compounds by a direct vapor phase reaction of a halogen and an aromatic compound in an open tube in the absence of catalyst. Halogenated aromatic compounds are useful as electrical insulators, additives in lubricants, as fire resistant heat transfer and hydraulic fluids, and constituents in elastomers, adhesives, paints, and waxes.

1 Claim, No Drawings

PREPARATION OF HALOGENATED AROMATIC COMPOUNDS

CROSS-REFERENCE TO RELATED APPLICATION

Application of Simon Pierce Burns, Ser. No. 873,588, filed of even date refers to the direct vapor phase reaction of benzene and chlorine in the absence of catalyst.

BACKGROUND OF THE INVENTION

1. Field of the Invention

The invention pertains to the field of halogenated hydrocarbons.

2. Description of the Prior Art

Tiganik's U.S. Pat. No. 3,406,211, Robinson's U.S. Pat. No. 3,379,780, and Massengale's U.S. Pat. No. 3,007,975 disclose various catalytic methods of halogenating aromatic compounds. The process of our invention requires no catalyst and is, therefore, distinguished from this art.

Thermit's U.S. Pat. No. 3,029,295 and McCullough's U.S. Pat. No. 2,019,015 describe the non-catalytic vapor phase chlorination of biphenyl. However, the art of Thermit teaches the use of a fluidized bed reactor. This type of reactor is difficult to maintain and involves the problems of close vapor velocity control and bed maintenance. The art of McCullough teaches the use of packing in the reactor which also has the disadvantage of maintenance. The process of our invention uses an open tube reactor which has the advantage of simplicity of design and operation, low cost, and reduced maintenance over the process of Thermit or McCullough. McCullough's process must be carried out below the decomposition temperature of biphenyl and its chlorinated derivatives, page 1, column 2, lines 5 – 20. The decomposition temperature of biphenyl is from 510° C. to 540° C. and of decachlorobiphenyl is from 510° C. to 520° C. Thermit's process claims a temperature range of 460° C. to 530° C. It is therefore very surprising to discover that the preferred temperatures for our invention as it concerns biphenyl are from 650° C. to 850° C., well above the published decomposition temperature of biphenyl, and also well above the temperature ranges of McCullough and Thermit. Little or no decomposition is encountered in the process of my invention. Almost stoichiometric conversion of biphenyl to the halogenated products is obtained.

SUMMARY OF THE INVENTION

The invention is a process for halogenating aromatic compounds such as biphenyl, ortho-terphenyl, meta-terphenyl, para-terphenyl, tetraphenyls, pentacenes, hexacenes, napthalene, anthracene, phenanthrene, and the partially halogenated derivatives of the above by the noncatalytic vapor phase reaction of a halogen and the aromatic compound in an unpacked reactor at a temperature of about 650° C. to about 850° C.

PREFERRED EMBODIMENTS

The aromatic compounds useful in the process of our invention are unsubstituted or substituted with halogens to less than saturation. Examples of suitable aromatic hydrocarbons useful in the process of my invention include biphenyl, ortho-terphenyl, meta-terphenyl, para-terphenyl, tetraphenyls, pentacenes, hexacenes, naphthalene, anthracene, phenanthrene, and the partially halogenated derivatives of the above. The preferred aromatic hydrocarbon useful in our invention is biphenyl.

Any of the halogens may be useful in the process of our invention but the one preferred is chlorine.

A diluent material may be introduced into the reaction zone along with the vaporized halogen and the vaporized aromatic compound. The necessary properties of the diluent are that it be inert to the reaction between the halogen and the aromatic compound and that it be a gas or vapor at the reaction temperature. A convenient diluent is nitrogen.

The temperature of the reaction, ratio of reactants and velocity of thruput determine the degree of halogenation and the percent conversion (yield) of the aromatic compound to the halogenated aromatic compound. Since such a wide range of reactants and products are possible using the process of my invention, it is impossible to set general parameters.

Each of these variables will affect the reaction in a generally predictable manner. By holding the ratio of reactants and the contact time constant, the temperature may be adjusted. At some minimum temperature above the boiling point of the aromatic and the halogen, about 400° C., the reactants will begin to react in the vapor phase and a low yield of partially halogenated aromatics will result. As the temperature is increased the yields and degree of halogenation will increase. Further temperature increase will result in almost 100 percent yield of halogenated aromatics. Finally, as the temperature is raised further the degree of halogenation reaches about 100 percent also. As stated, the temperature where about 100 percent yields and about 100 percent halogenation occurs, 650° C. to 850° C., is well above the published decomposition temperature of the aromatic and the halogenated aromatic and yet no decomposition occurs in our process. The preferred maximum temperature where about 100 percent yield of about 100 percent halogenated aromatic is obtained is about 850° C., but higher temperatures may be used if desired.

Holding temperature and ratio of reactants constant, the contact time may be adjusted from short to long with similar effects as increases in temperature. The same may be said of ratio of reactants although the ratio of reactants will never cause decomposition.

The following examples demonstrate conditions used in a series of vapor phase reactions between chlorine and biphenyl in the presence of nitrogen as a diluent.

The reactions were all carried out in a Vycor tube (21 inches by 25 mm.) which was externally heated along its whole length by an electric furnace. The maximum temperature given in the examples occurred at approximately midway along the reactor tube. In all of the examples the chlorine was pressured into the reactor and measured by rotometer. In Examples I through IX, the biphenyl was melted in a melting pot and pressured by nitrogen through a rotometer. The biphenyl was then pressured into a vaporizing pot heated by a mantle, and the resulting biphenyl vapor was mixed with nitrogen which was also fed into the vaporizing pot. The biphenyl vapor/nitrogen mixture then proceeded to the reactor inlet where it came in contact with the chlorine. The chlorine, biphenyl vapor, and nitrogen then proceeded to pass through the open tube reactor and the resulting halogenated product was collected by a water scrubber. The purity of the recovered product was measured accurately by gas-liquid chromatography, but the percentage of biphenyl conversion to halogenated biphenyl (yield) depended on the precise measurement of biphenyl fed to the reactor. This particular apparatus did not yield accurate measurements of biphenyl feed; therefore, the yield calculations for Examples I through IX are inaccurate and were omitted. Examples X and XI were run using a heated Ruska Proportioning pump to feed the biphenyl in place of the melting pot and rotometer used in Examples I through IX. This metering pump very accurately measured the biphenyl fed to the reactor and the yield calculations were accurate. The purity of the product was not affected by the ratio of chlorine to biphenyl which ranged from 28 moles chlorine to 1 mole biphenyl to 60 moles chlorine to 1 mole biphenyl. Likewise the contact time or velocity of the components had little effect on the purity of the final product. It was discovered, however, that the maximum temperature of reaction did affect the purity of the final product. The runs below 700° C. had purities below 90 percent while those above 700° C. had purities above 95 percent. It was determined that the portion of the product which was not decachlorobiphenyl was a mixture of lower chlorinated biphenyl products. These examples are only illustrative and are not meant to limit the scope of the invention. A lower mole ratio of chlorine to biphenyl and shorter contact times would at some point adversely effect purity and yield. In the ranges used, the yield (conversion of biphenyl to some chlorinated biphenyl) was at or near 100 percent. As explained above, very accurate means were used to measure the yields of Examples X and XI to demonstrate this improvement in yield.

Halogenated aromatic compounds are useful as electrical insulators, additives in lubricants, fire resistant heat transfer and hydraulic fluids, and constituents in elastomers, adhesives, paints, and waxes.

EXAMPLES

| | Vapor Thruput l/hr at STP | | Mol Bi-phenyl | Mol $Cl_2$ Bi-phenyl | Contact time, seconds | Maximum temp, °C. | % Decachlorobiphenyl in product | Yield of chlorinated Biphenyl |
|---|---|---|---|---|---|---|---|---|
| | $Cl_2$ | $N_2$ | | | | | | |
| I | 112 | .8 | 98.5 | 3.8 | 30/1 | 2.4 | 738 95.1 | — |
| II | 127 | .2 | 67.5 | 2.8 | 45/1 | 2.6 | 742 95.1 | — |
| III | 127 | .2 | 67.5 | 3.3 | 38/1 | 2.6 | 762 99.0 | — |
| IV | 98 | .5 | 51.1 | 3.5 | 28/1 | 3.5 | 724 99.0 | — |
| V | 98 | .5 | 51.1 | 3.4 | 28/1 | 3.5 | 720 97.8 | — |
| VI | 137 | | 69.1 | 2.3 | 60/1 | 2.6 | 675 89.2 | — |
| VII | 137 | | 69.1 | 2.7 | 51/1 | 2.6 | 710 96.1 | — |
| VIII | 137 | | 69.1 | 2.7 | 51/1 | 2.6 | 733 98.0 | — |
| IX | 137 | | 69.1 | 2.7 | 51/1 | 2.6 | 640 84.3 | — |
| X | 137 | | 69.1 | 2.7 | 51/1 | 2.6 | 701 98.3 | 99.7 |
| XI | 134 | | 69.1 | 2.7 | 50/1 | 2.6 | 716 — | 99.6 |

What is claimed is:

1. In a process for preparing chlorinated aromatic compounds by reacting in the noncatalytic vapor phase chlorine and biphenyl, or the partially halogenated derivatives thereof, the improvement which comprises:
reacting said chlorine with the said biphenyl for a time in the range of 2.4 to 3.5 seconds open unpacked tubular reactor heated to a temperature of from about 650° C. to about 850° C.

* * * * *